Feb. 19, 1963    R. A. BERNER    3,077,982
PALLET
Filed March 4, 1960

INVENTOR.
ROLAND A. BERNER
BY
ATTORNEYS 3,077,982
PALLET
Roland A. Berner, Altadena, Calif., assignor, by mesne assignments, to Ceramic Combustion and Engineering Company, Los Angeles, Calif., a corporation of California
Filed Mar. 4, 1960, Ser. No. 12,726
10 Claims. (Cl. 206—65)

This invention relates generally to pallets for supporting load-units, and more particularly to pallets constructed largely of a plurality of the load-units, and to methods of palletizing such units. A particularly useful application of the invention is in connection with the building industry where bricks or building blocks represent the load-units. Therefore, I have chosen to show bricks as the load-units, but this is not to be taken as limitative on the claims.

Some years ago it was common practice for brick manufacturers to deliver bricks to a job site by loading them at random into the body of a dump truck, and then dumping them from the truck onto the ground at the site. This resulted in breaking or chipping a considerable number of bricks, besides leaving them in an inconvenient and unorderly arrangement. At this time the only alternative was to load and unload the bricks by hand, which obviously was economically unfeasible.

A significant improvement came about in recent years with the advent and subsequent widespread use by the industry of fork lifts for loading and unloading. The bricks are normally loaded with a fork lift onto a delivery truck at the manufacturer's plant, and unloaded at the job site by fork lift.

In order to utilize a fork lift for moving bricks, the bricks were necessarily stacked on pallets, usually constructed of wood or steel. Since the pallets represent a substantial investment to the manufacturer, they must be returned and reused many times to justify the investment. To insure that they are returned, the customer is normally charged a deposit which is refunded when the pallets are returned. This procedure is inconvenient to both the customer and the manufacturer because of the records and finances involved, and even more so to the party who must dispatch a truck to return the pallets. In addition, the manufacturer must maintain an inventory of considerably more pallets than are actually in use because of the delay between the time of delivery and the time of return. Thus, it is readily evident that the use of such pallets leaves much to be desired.

It is, therefore, an object of this invention to provide a novel pallet, the pallet being disposable in the sense that it is constructed largely of units identical to those of the load, and therefore usable themselves. That is, the pallet, itself, is part of the useful load.

A further object is to provide a method of palletizing a load of bricks so as to make the load suitable for movement with a fork lift, and wherein usable bricks make up a greater proportion of the total load than has heretofore been possible.

Another object is to provide a disposable pallet which is simple and inexpensive to construct, yet which is entirely satisfactory in the service for which it is intended.

These and other objects of the invention will be better understood by referring to the following detailed description of an illustrative embodiment taken in conjunction with the accompanying drawing, in which.

Figure 1:
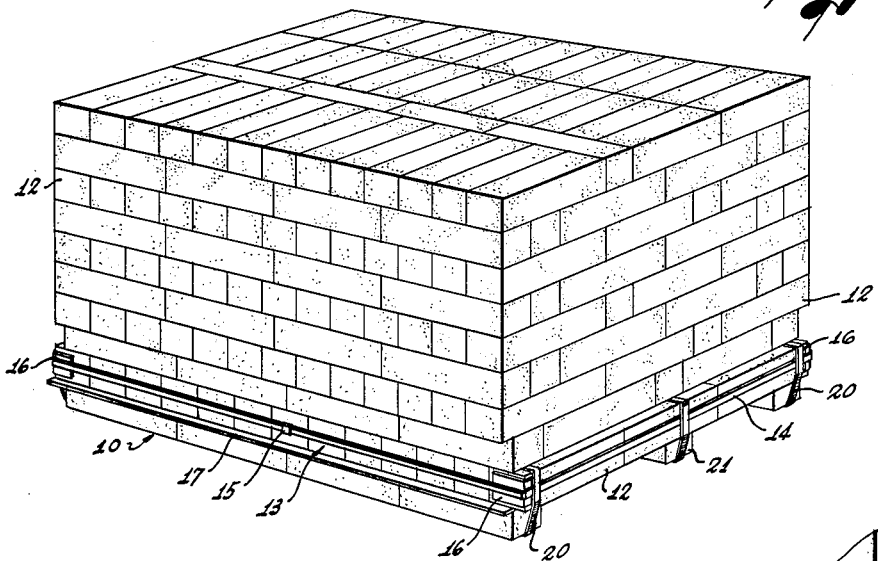
FIGURE 1 is a perspective view of the pallet of my invention with tiers of bricks stacked thereon.
Figure 2:
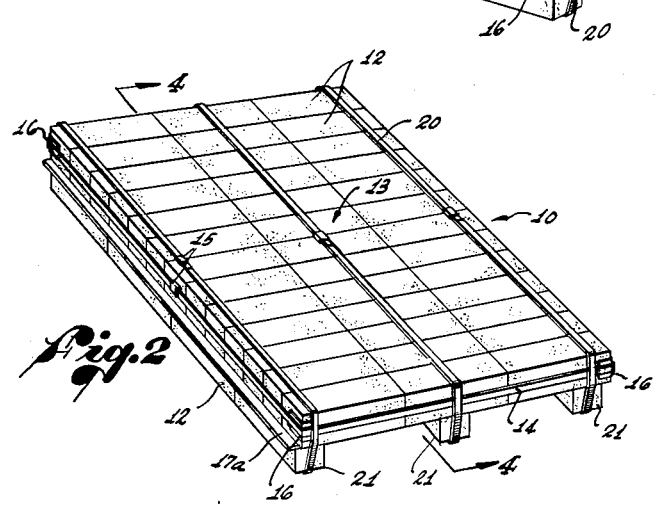
FIGURE 2 is a perspective view of said pallet.
Figure 3:
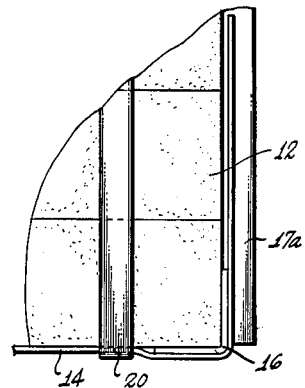
FIGURE 3 is an enlarged plan detail of a corner of the pallet.
Figure 4:
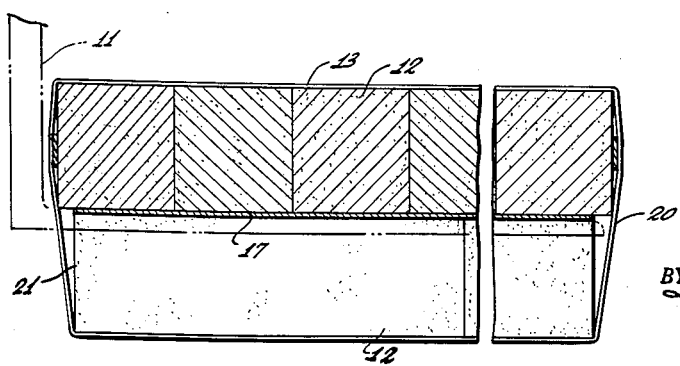
FIGURE 4 is an enlarged section taken on the line 4—4 of FIGURE 2.

With reference to the drawing, and particularly FIGURES 2 and 4 thereof, the numeral 10 designates generally a pallet made according to my invention, with forks 11 of a common fork lift (not shown) in the lifting position. For illustrative purposes, pallet 10 is shown constructed primarily of common rectangular burnt bricks, hereinafter referred to as blocks 12. However, it will be understood that bricks or concrete blocks of various shapes, or other load-units, having sufficient structural rigidity, could be substituted for common rectangular bricks without departing from the scope of the invention. Blocks 12 may be of any reasonable size; however, it is preferred that the individual blocks in any one pallet be of uniform size.

A platform 13 is formed by arranging a predetermined number of blocks 12 in a horizontal layer. In this instance a plurality of contacting rows of blocks 12 are provided, so as to form a horizontal layer of rectangular outline. The individual blocks abut one another end-to-end and side-to-side, each thus presenting lateral edge surfaces abutting corresponding surfaces on adjacent blocks. A steel tension band 14, secured with a crimp seal 15 around the periphery of platform 13, compresses blocks 12 in such a manner that abutting lateral surfaces on adjacent blocks are forced into frictional engagement. Sufficient tension is applied to band 14 in compressing blocks 12 to insure that the frictional engagement between abutting blocks is adequate to provide platform 13 with structural rigidity in the vertical direction. The tensioned band 14 also provides platform 13 with ample structural rigidity in the horizontal directions. Interposed between band 14 and the corners of platform 13 are protective strips 16 formed of a suitable material such as corrugated cardboard. Strips 16 provide bearing surfaces for band 14, whereby the band may slip around platform 13 as it is tightened without chipping or breaking the corner blocks.

A sheet 17 of a material such as corrugated cardboard is disposed on the bottom of platform 13 preferably with edge portions 17a extending beyond the outermost blocks of the platform. Sheet 17 serves the dual purpose of protecting the blocks of platform 13 from forks 11 of the fork lift, and of supporting any blocks which should work loose from platform 13, because of being slightly undersize, and would otherwise drop free.

Bound to the bottom of platform 13 with steel bands 20 are parallel rows 21 of blocks 12 with sheet 17 sandwiched between the rows 21 and the platform. The function of rows 21 of blocks 12 is to space platform 13 above the ground so that forks 11 of the fork lift have free access to the bottom of the platform. Protective strips 16 are not required between bands 20 and engaging blocks 12, as sufficient tension is applied to merely retain the members in assembly, this being considerably less than that which would cause breaking or chipping of the corner blocks.

In the preferred method of palletizing blocks 12 to provide a load suitable for movement with a fork lift, parallel rows 21 of blocks 12 are positioned on the ground. The lateral spacing of rows 21 is, of course, dependent upon the size and shape pallet desired, but it must be sufficient to provide for free passage of forks 11 of the fork lift between the rows. Although two rows 21 are usually sufficient to support a loaded pallet, a third or center row is normally provided for added stability. Block supporting and protecting sheet 17 is then positioned on rows 21 of blocks 12, the size of the sheet, preferably being just slightly larger than the size of the pallet desired. A plurality of blocks 12 are arranged on sheet 17 to form platform 13 and block protecting strips 16 are placed around the corners of the periphery of platform 13. Tension band 14 is then secured as with crimp seal 15 around the periphery of platform 13, compressing blocks 12 into forceful frictional engagement. Rows 21 of blocks 12 are banded with steel bands 20 to platform 13, retaining the last mentioned members in assembly and sandwiching sheet 17 therebetween. Tiers of blocks 12 of the same size as those forming the pallet 10 are lastly stacked thereon.

In use, a fork lift or similar loading device is utilized to load the palletized load of building units onto a delivery truck at the manufacturer's plant, and then to unload it at the job site. After using the blocks 12 stacked on pallet 10, workmen merely cut bands 14 and 20, and then use the additional blocks 12 making up the pallet in the construction project. Thus, in effect, a palletized load has been provided in which the pallet, itself, is actually part of the useful load of the material transported.

Although the invention has been described with a certain degree of particularity, it will be understood that this is by way of example of one embodiment, and that numerous changes in the construction and arrangement may be made, particularly in the arrangement of the load-units, without departing from the spirit or scope of the invention. For this reason, I do not mean to be limited except as may fairly be construed from the appended claims.

I claim:

1. A pallet supporting a plurality of substantially uniformly sized load-units stacked thereon in multiple layers comprising: a plurality of laterally contiguous load-units of the same uniform size as the load-units stacked thereon arranged to form a horizontal platform upon which the additional load-units are stacked, each of said laterally contiguous units having a portion of at least one lateral exterior surface frictionally contacting at least one lateral exterior surface of another unit; and a horizontally extending tension band secured around the periphery of said platform pressing said frictionally contacting surfaces into forceful frictional engagement, so as to provide said platform with structural rigidity in all directions, the stacked load-units being usable with the tension band intact and the integrity of the platform maintained.

2. A pallet supporting a plurality of substantially uniformly sized load-units stacked theron in multiple layers comprising: a plurality of laterally contiguous load-units of the same uniform size as the load-units stacked thereon and forming a horizontal platform, lateral friction surfaces on said laterally contiguous units, said laterally contiguous units being positioned such that each has at least a portion of one of said lateral friction surfaces contacting at least one lateral friction surface of another unit; and a horizontally extending tension band secured around the periphery of said platform pressing said contacting friction surfaces into forceful frictional engagement, so as to provide said platform with structural rigidity in all directions, the stacked load-units being usable with the tension band intact and the integrity of the platform maintained.

3. A pallet supporting a plurality of substantially uniformly sized load-units stacked thereon in multiple layers comprising: a horizontal platform composed of a plurality of laterally contiguous load-units of the same uniform size as the load-units stacked thereon and having lateral friction surfaces, said laterally contiguous units being positioned such that each has at least a portion of one of said lateral friction surfaces contacting at least one lateral friction surface of another unit; a horizontally extending tension band secured around the periphery of said platform pressing said contacting friction surfaces into forceful frictional engagement, so as to provide said platform with structural rigidity in all directions; laterally spaced means disposed beneath said platform, thereby spacing said platform above the ground; strap means binding said laterally spaced means to said platform; and a protective sheet sandwiched between said platform and said laterally spaced means, the stacked load-units being usable with the tension band and strap means intact and the integrity of the platform and spaced means maintained.

4. A pallet supporting a plurality of substantially uniformly sized load-units stacked thereon in multiple layers comprising: a plurality of laterally contiguous load-units of the same uniform size as the load-units stacked thereon arranged to form a horizontal platform; lateral friction surfaces on said laterally contiguous units, said laterally contiguous units being positioned such that each has at least a portion of one of said lateral friction surfaces contacting at least one lateral surface of another unit; horizontally extending tension means secured around the periphery of said platform pressing said contacting surfaces into forceful frictional engagement, so as to provide said platform with structural rigidity in all directions, the stacked load-units being usable with the tension means intact and the integrity of the platform maintained; and protective means interposed between said tension means and the periphery of said platform precluding said tension means from damaging said units as tension is applied.

5. A pallet supporting a plurality of substantially uniformly sized block type load-units stacked thereon in multiple layers comprising: a horizontal platform composed of a plurality of laterally contiguous block type load-units of the same uniform size as the load-units stacked thereon and having lateral friction surfaces, said laterally contiguous units being positioned such that the frictional surfaces of contiguous units are in engagement; a horizontally extending tension band secured around the periphery of said platform pressing said contacting friction surfaces into forceful frictional engagement, so as to provide said platform with structural rigidity; protective means interposed between said tension band and the periphery of said platform protecting said units from damage from said band; a protective sheet disposed on the bottom of said platform; parallel rows of additional block type load-units of said same uniform size positioned on the bottom of said platform near opposite sides thereof; and bands securing said rows of units to said platform with said protective sheet sandwiched therebetween, the stacked load-units being usable with the tension band and the last mentioned bands intact and the integrity of the platform and bottom load-units maintained.

6. A pallet supporting a plurality of substantially uniformly sized rectangular bricks stacked thereon in multiple layers comprising: a plurality of uniformly rectangular and laterally contiguous bricks of the same uniform size as the bricks stacked thereon, said laterally contiguous bricks being arranged to form a horizontal platform, each of said laterally contiguous bricks having at least a portion of one surface contacting at least one lateral surface of another brick; a horizontally extending tension band secured around the periphery of said platform compressing said contacting bricks into forceful frictional engagement, so as to provide said platform with structural rigidity in all directions; protective strips interposed between said band and the corners of said platform precluding said band from damage said bricks as tension is applied; horizontal rows of bricks of said same uniform size disposed against the bottom of said platform near opposite edges thereof; strap means binding said horizontal rows of bricks to said platform; and a brick-supporting and protecting sheet sandwiched between said platform and said rows of bricks, said stacked bricks being usable with said tension band and strap means intact and the integrity of the platform and rows of bricks maintained 7. A pallet supporting a plurality of substantially uniformly sized bricks stacked thereon in multiple layers comprising: a plurality of uniformly rectangular and laterally contiguous bricks of the same uniform size as the bricks stacked thereon arranged in a single layer to form a horizontal platform, each of said single layer bricks having at least a portion of one surface contacting at least one lateral surface of another brick; a horizontally extending tension band secured around the periphery of said platform compressing said single layer contacting bricks into forceful frictional engagement so as to provide the platform with structural rigidity in all directions; horizontally spaced rows of bricks of said same uniform size disposed against the bottom of said platform at least adjacent the opposite edges thereof and in a position intermediate said edges; and vertically extending tension bands wrapped around said platform and said horizontally spaced rows of bricks to secure the rows of bricks to the platform, said stacked bricks being usable with said tension bands intact and the integrity of the platform and rows of bricks maintained.

8. A pallet supporting a plurality of substantially uniformly sized bricks stacked thereon in multiple layers comprising: a plurality of uniformly rectangular and laterally contiguous bricks of the same uniform size as the bricks stacked thereon arranged in a single layer to form a horizontal platform, each of said single layer bricks having at least a portion of one surface contacting at least one lateral surface of another brick; a horizontally extending tension band secured around the periphery of said platform compressing said single layer contacting bricks into forceful frictional engagement so as to provide the platform with structural rigidity in all directions; protective strips of cushioning material interposed between said tension band and the corners of said platform precluding said band from damaging the corner bricks as tension is applied; horizontally spaced rows of bricks of said same uniform size disposed against the bottom of said platform at least adjacent the opposite edges thereof and in a position intermediate said edges; and vertically extending tension bands wrapped around said platform and said horizontally spaced rows of bricks to secure the rows of bricks to the platform, said stacked bricks being usable with said tension bands intact and the integrity of the platform and rows of bricks maintained.

9. A pallet supporting a plurality of substantially uniformly sized bricks stacked thereon in multiple layers comprising: a plurality of uniformly rectangular and laterally contiguous bricks of the same uniform size as the bricks stacked thereon arranged in a single layer to form a horizontal platform, each of said single layer bricks having at least a portion of one surface contacting at least one lateral surface of another brick; a horizontally extending tension band secured around the periphery of said platform compressing said single layer contacting bricks into forceful frictional engagement so as to provide the platform with structural rigidity in all directions; protective strips of cushioning material interposed between said tension band and the corners of said platform precluding said band from damaging the corner bricks as tension is applied; horizontally spaced rows of bricks of said same uniform size disposed against the bottom of said platform at least adjacent the opposite edges thereof and in a position intermediate said edges; vertically extending tension bands wrapped around said platform and said horizontally spaced rows of bricks to secure the rows of bricks to the platform; and a brick supporting and protecting sheet of cushioning material sandwiched between said platform and said horizontally spaced rows of bricks therebeneath, said stacked bricks being usable with said tension bands intact and the integrity of the platform and rows of bricks maintained.

10. A pallet supporting a plurality of substantially uniformly sized bricks stacked thereon in multiple layers comprising: a plurality of uniformly rectangular and laterally contiguous bricks of the same uniform size as the bricks stacked thereon arranged in a single layer to form a horizontal platform, each of said single layer bricks having at least a portion of one surface contacting at least one lateral surface of another brick; a horizontally extending tension band secured around the periphery of said platform compressing said single layer contacting bricks into forceful frictional engagement so as to provide the platform with structural rigidity in all directions; protective strips of cushioning material interposed between said tension band and the corners of said platform precluding said band from damaging the corner bricks as tension is applied; horizontally spaced rows of bricks of said same uniform size disposed against the bottom of said platform at least adjacent the opposite edges thereof and in a position intermediate said edges; vertically extending tension bands wrapped around said platform and said horizontally spaced rows of bricks to secure the rows of bricks to the platform; and a brick supporting and protecting sheet of cushioning material sandwiched between said platform and said horizontally spaced rows of bricks therebeneath, said single layer platform, the supporting rows of bricks therebeneath, the tensioning bands and cushioning material forming a self-contained unitary pallet construction supporting multiple layers of bricks thereon with the stacked, supported bricks usable while the tensioning bands are intact and the self-contained unitary pallet construction maintained, and said pallet being adapted for disassembly at its delivery point to provide for consumption of the bricks of which it is made into a building structure.

References Cited in the file of this patent
UNITED STATES PATENTS

| | | |
|---|---|---|
| 2,630,214 | Reed | Mar. 3, 1953 |
| 2,778,491 | Taylor | Jan. 22, 1957 |
| 2,869,721 | Baumer | Jan. 20, 1959 |
| 2,908,122 | Allen | Oct. 13, 1959 |
| 2,933,207 | Edmonds | Apr. 19, 1960 |
| 2,962,163 | Else | Nov. 29, 1960 |